D. SEWELL.
AUXILIARY GASOLINE TANK FOR AUTOMOBILES.
APPLICATION FILED JULY 6, 1920.

1,423,158.

Patented July 18, 1922.
2 SHEETS—SHEET 1.

INVENTOR
D. Sewell
BY
ATTYS

D. SEWELL.
AUXILIARY GASOLINE TANK FOR AUTOMOBILES.
APPLICATION FILED JULY 6, 1920.
1,423,158.
Patented July 18, 1922.
2 SHEETS—SHEET 2.
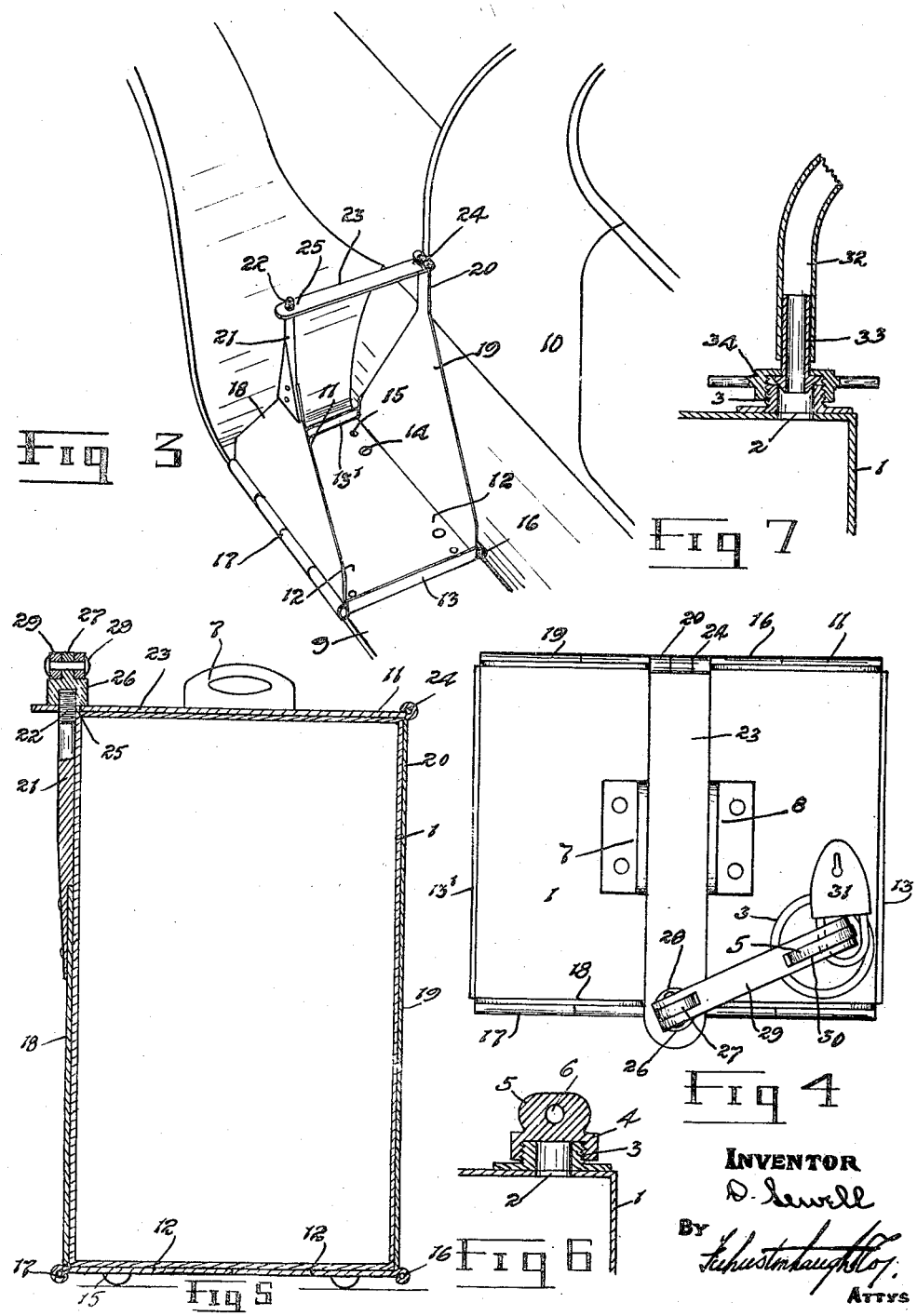

UNITED STATES PATENT OFFICE.

DANIEL SEWELL, OF EDMONTON, ALBERTA, CANADA.

AUXILIARY GASOLINE TANK FOR AUTOMOBILES.

1,423,158.  Specification of Letters Patent.  Patented July 18, 1922.

Application filed July 6, 1920. Serial No. 394,022.

*To all whom it may concern:*

Be it known that I, DANIEL SEWELL, of the city of Edmonton, in the Province of Alberta, Canada, have invented certain new and useful Improvements in Auxiliary Gasoline Tanks for Automobiles, of which the following is the specification.

The invention relates to improvements in auxiliary gasoline tanks for automobiles and the general object of the invention is to provide an auxiliary tank demountably attached to an automobile for carrying a reserve supply of gasoline and which can be used for emergency purposes.

A further object of the invention is to construct as part of the equipment a special tank and holder for the tank, particularly designed for mounting on the running board or other suitable part of an automobile or truck and with the holder arranged so that it can be positively locked to prevent either the removal of the tank or the withdrawal of the gasoline from the tank without first unlocking a padlock provided.

A still further object is to construct the holder in a simple, inexpensive, light and durable manner and such that the one locking prevents both the removal of the tank and the extraction of gasoline from the tank.

With the above more important objects in view the invention consists essentially in the arrangement and construction of parts hereinafter more particularly described and later pointed out in the appended claims, reference being had to the accompanying drawings in which:—

Fig. 3 is a view similar to Fig. 2 with the tank and locking bar removed.

Fig. 4 is a plan view of the tank in the holder.

Fig. 5 is a vertical sectional view centrally through the tank and the holder.

Fig. 6 is an enlarged detailed vertical sectional view through the filling cap.

Fig. 7 is an enlarged detailed sectional view through the winged nut and associated parts which are substituted for the filling cap when the hose is used.

In the drawings like characters of reference indicate corresponding parts in the several figures.

Figure 1:
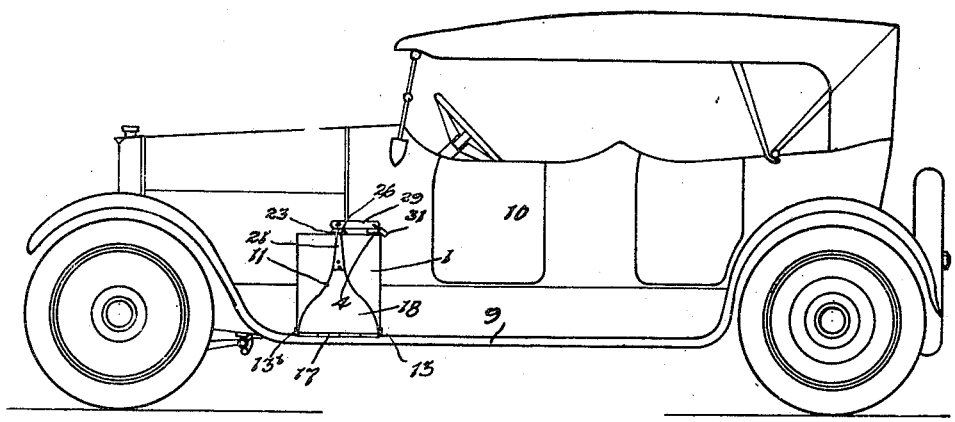
Fig. 1 is a side view of the auxiliary tank and holder as they appear installed on the running board.
Figure 2:
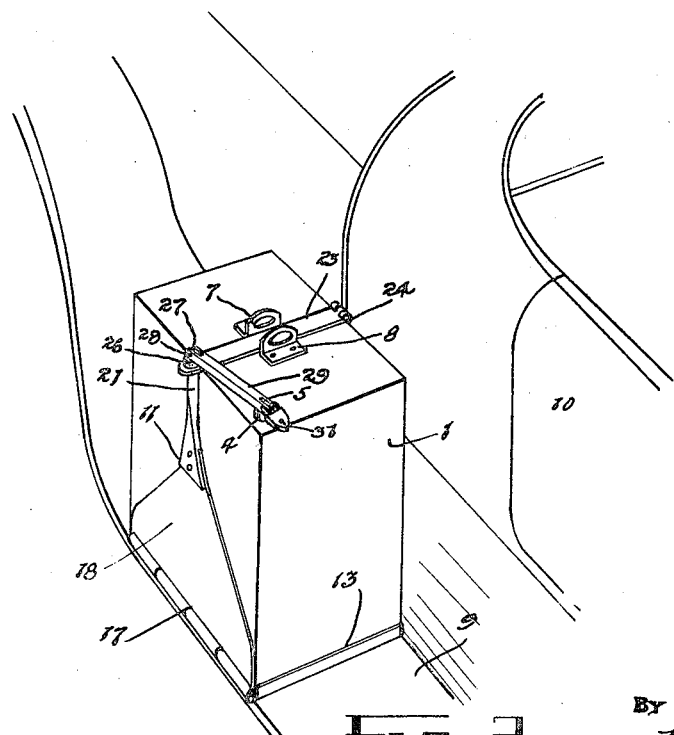
Fig. 2 is a perspective view of the invention on the running board.

The auxiliary tank which I supply is provided to carry a reserve quantity of gasoline and is designed so that it will seat on the automobile in a convenient location and will not detract from the general looks of the automobile.

The tank 1 is a substantially rectangular metallic one having a permanently closed top which is provided at one of the corners with a filling opening 2. At the opening I supply an upstanding screw threaded boss 3 fitted with a removable screw cap 4, the cap being supplied with a vertically extending wing 5 having a cross opening 6 therein. This filling opening is the only entrance to the interior of the tank and is used for filling the tank with gasoline and for removing the gasoline from the tank as occasion may require.

Centrally on the top of the tank I mount a pair of spaced transversely extending combination stops and handles 7 and 8 which are suitably riveted to the tank. The tank is held in position on the running board 9 of the automobile 10 by a holder 11 which receives the tank and is formed as now described in detail.

12 is a fastening plate provided with suitable bolt holes whereby it can be conveniently bolted as shown at 14 permanently to the running board and provided further with suitably disposed cushions 15 provided to absorb shock and with end flanges 13 and 13′ for a purpose later disclosed. To the plate I connect pivotally as by hinging as indicated at 16 and 17 two normally upstanding side arms 18 and 19 which are the same width as the plate at their lower end and then gradually taper upwardly, the upper end of the arm 19 extending into a strap like extension 20, whilst the upper end of the plate 18 terminates in a shank 21 permanently riveted to the arm and having the upper end screw threaded as shown at 22.

23 is a hasp having one end pivotally connected at 24 as by hinging to the upper end of the extension 20 and the other end fitted with a slot 25 which is adapted to receive the upper end of the shank.

The above parts of the holder are arranged such that they will receive the tank which seats on the plate 12 snugly between the side arms 18 and 19 and the flanges 13 and 13' and directly beneath the hasp.

When the tank is in position within the holder the hasp is adapted to lie on the top of the tank and pass between the handle like members 7 and 8. This arrangement together with the flanges prevents forward or backward movement of the tank.

26 is a nut screw threaded on to the upper end of the shank and provided with a winged extension 27 to which I pivotally connect as by a rivet 28 the forked end of a locking bar 29 which has the free end vertically slotted at 30 to span the wing 5 of the filling cap. The latter end of the locking bar is supplied with openings adapted to register with the opening 6 of the wing, such permitting of the fastening and positive locking of the locking bar to the wing 5 by the application of a padlock 31.

From the above arrangement it will be obvious that when the tank is in the holder and the holder is locked by the padlock it is impossible either to remove the tank or undo the filling cap as the locked locking bar fastens both the hasp and the filling plug.

Obviously by undoing and removing the padlock one can gain access to the gasoline within the tank or can remove the tank, this latter being accomplished by rotating the locking bar to undo the nut 26 and permit the hasp to be released from the shank and clear it from the handle like members 7 and 8.

In order to allow of an emergency feeding from the auxiliary tank to the carburetor of the automobile engine in the event of fracture or breakdown of the usual gasoline feed pipe I desire to provide as part of the equipment of my appliance a length of hose 32 fitted with a nipple 33 and a winged nut 34 and with the nipple and nut designed so that it can be readily attached to the boss 3 after the filling cap 4 has been removed. Obviously by releasing the tank and attaching the hose one can feed gasoline directly to the carburetor when occasion demands.

Whilst I have shown this device as mounted on the running board of an automobile, still I wish it to be understood that it can be placed with equal facility on any other convenient part as the running board simply forms a convenient support to which one may fasten the plate 12.

What I claim as my invention is:—

1. The combination with the running board of a motor vehicle and an auxiliary gasoline tank, of a holder for the tank secured to the running board and comprising a bottom plate permanently fastened to the running board and situated beneath the bottom of the tank, a pair of opposing upstanding side arms extending from the plate and located to the sides of the tank, a hasp pivotally secured to the upper end of one of the side arms and passing across the top of the tank and provided with an opening receiving the upper end of the other of the side arms, stops secured to the top of the tank and located to the sides of the hasp and releasable means for securing the hasp to the latter side arm.

2. The combination with a support and a tank provided with a removable filling cap, of a holder for the tank comprising side arms located at the sides of the tank and permanently fastened at their lower ends to the support, a screw threaded shank secured to the upper end of one of the side arms, a hasp pivotally secured to the upper end of the other of the side arms and crossing the top of the tank and provided with an opening receiving the shank, a nut screw threading on to the shank above the hasp and a locking bar pivotally attached to the nut and releasably locked to the filling cap in a manner to prevent rotation of the cap.

3. The combination with a support and a tank provided with a removable filling cap, of a bottom plate permanently secured to the support beneath the tank and fitted with end flanges, a pair of side arms extending upwardly at the sides of the tank and pivotally secured to the edges of the bottom plate, a shank permanently secured to the upper end of one of the side arms and having the upper end thereof screw threaded, a hasp pivotally secured to the upper end of the other of the side arms and crossing the top of the tank and having the free end thereof slotted and receiving the shank, stops secured to the top of the tank and positioned at opposite sides of the hasp, a nut screw threaded on to the upper end of the shank above the hasp, a locking bar pivotally secured to the nut and extending to the filling plug and a padlock locking the locking bar to the filling plug.

4. In a motor vehicle, the combination with a fixed support, of a substantially rectangular auxiliary gasoline tank mounted on the support and provided at one of its upper corners with a filling inlet and discharge outlet opening, a cap closing the opening and a normally locked but releasable holder receiving the tank and holding it normally against removal from the support and locking the filling cap closed, said filling cap having to be unlocked prior to releasing the tank.

5. In a motor vehicle, the combination with a fixed support, of a substantially rectangular auxiliary gasoline tank mounted on the support and provided at one of its upper corners with a filling inlet and discharge outlet opening, a cap closing the opening, a holder permanently mounted on the support and provided with a retaining hasp passing across the top of the tank, a member associated with the holder and passing across to the cap and adapted to lock the hasp closed against the top of the tank and a lock for fastening the member to the cap.

6. In a motor vehicle, the combination with a fixed support, of a substantially rectangular auxiliary gasoline tank mounted on the support and provided at one of its upper corners with a filling inlet and discharge outlet opening, a cap closing the opening, a holder permanently mounted on the support and provided with a retaining hasp passing across the top of the tank and means associated with the holder and the cap and locked to the cap and adapted when locked to the cap to lock the hasp against movement.

Signed at Edmonton, this 26th day of May 1920.

DANIEL SEWELL.

In the presence of:—
A. G. BAKER,
JOHN MACALISTER.